Patented Feb. 24, 1953

2,629,710

UNITED STATES PATENT OFFICE 2,629,710

HALOMETHYLATED VINYL-AROMATIC COPOLYMERS

Charles H. McBurney, Philadelphia, Pa.

No Drawing. Original application May 28, 1949, Serial No. 96,134. Divided and this application September 22, 1949, Serial No. 117,259

7 Claims. (Cl. 260—88.1)

This invention relates to insoluble resins containing reactive halogen atoms which may be readily replaced by polar groups to produce insoluble ion-exchange resins.

This application is a division of my U. S. application Serial No. 96,134, filed May 28, 1949, which in turn is a continuation-in-part of U. S. application Serial No. 759,308, filed July 5, 1947, and U. S. application Serial No. 20,836, filed April 13, 1948. This application is also a continuation-in-part of U. S. application Serial No. 759,309, filed July 5, 1947.

The resins of this invention are cross-linked polymers of aromatic vinyl compounds which contain halomethyl groups on the aromatic rings. When they are reacted with polar substances, such as the amines, polar groups are introduced whereby ion-exchange properties are introduced into the resins.

Resins of this class are readily prepared by first forming a base polymer and then halomethylating the base polymer.

The base polymer is most conveniently formed from styrene and divinyl benzene. Both of these materials are readily available and may be easily copolymerized by well known methods to give an insoluble polymer that possesses excellent physical and chemical properties. The divinyl benzene component of such a copolymer gives to the polymeric molecule a cross-linked structure which greatly increases the complexity of the molecule and decreases its solubility and compatibility with other materials. By varying the amount of the divinyl benzene used in the preparation of the copolymer, variations can be made in the physical properties of the polymeric material which carry through to the final ion-exchange material and which have a marked effect upon its utility. In general, the divinyl benzene component may vary from 0.1% to 40% of the total polymerizable materials on a molar basis. In practice, however, it is preferable to use at least 0.5% and for most purposes no benefit is derived from using over 8%. Copolymers made with from 0.5% to 2% divinyl benzene give finished ion-exchange resins of low density and high porosity. Denser resins of lower porosity are obtained by increasing the percentage of divinyl benzene in the copolymer, preferably to from 4 to 8% of the copolymer.

In place of styrene other aromatic monovinyl compounds can be used and in place of divinyl benzene other polyvinyl aromatic compounds can be used. Ortho, meta- and para-methyl styrenes, ortho-, meta-, and para-ethyl styrenes, and vinyl naphthalene are suitable monovinyl aromatic compounds. Likewise, the divinyl toluenes, naphthalenes, and xylenes as well as divinyl ethyl benzene and trivinyl benzene are suitable cross-linking polyvinyl aromatic compounds. What was said above concerning the amount of divinyl benzene as a cross-linking agent applies to these materials as well.

While it is preferable to use a polyvinyl aromatic compound to cross-link the polymeric molecule, the cross-linking can be accomplished by other means, one of which consists of the introduction of methylene bridges between the aromatic nuclei of a linear polymer of an aromatic monovinyl compound. This type of cross-linking is accomplished during the step of halomethylating the polymeric material and is hereinafter explained in detail.

The base polymeric material may be formed by any of the known polymerization processes such as polymerization in mass, in solvents for the monomeric material or in emulsion or suspension in a liquid that is not a solvent for the monomeric material. The last is the preferred method because it produces the polymer directly in the form of small spheroids or beads, the size of which can be regulated and controlled. Since the cross-linked base polymer is insoluble in the ordinary solvents, subsequent reactions must be carried out in a two-phase system. Furthermore, since the final ion-exchange resin is used in the form of small particles, it is desirable to carry out the subsequent steps upon particles of the base resin that will give the desired particle size in the finished resin. By adjustments in the composition of the suspending medium and in the rate of agitation during polymerization, the suspension polymerization process may be made to produce spheroids or beads of effective particle size of from 5 to 325 mesh U. S. Sieve Series. In some ion-exchange processes extremely fine particles of approximately 40 to 150 microns in diameter are particularly useful. In others larger particles are desired such as would pass a 30-mesh screen but not a 50-mesh. The ease with which the subsequent step of chloromethylating may be carried out depends to some extent upon the particle size of the base polymer being treated and also upon its porosity. Small particles and porous polymers are more readily halomethylated than are larger particles of denser polymers.

As has been explained above, the porosity of the resin is dependent largely upon the percentage of cross-linking compound in the base polymer. A more porous resin is also formed if an inert solvent for the monomers which is immiscible with the suspending liquid is added to the monomers and, after polymerization, is removed by leaching, drying, or distilling from the hard polymerized particles.

The polymerization of the vinyl compounds is accelerated by means of well known catalysts which provide oxygen. These catalysts include ozone; organic peroxidic agents typified by ozonides, peroxides such as acetyl peroxide, lauroyl peroxide, stearoyl peroxide, tert.-butyl hydroperoxide, benzoyl peroxide, tert.-butyl perbenzoate, di-tert.-butyl diperphthalate, di-tert.-butyl peroxide, and the barium salt of tert.-butyl hydroperoxide; inorganic agents such as barium peroxide, sodium peroxide, hydrogen peroxide, and the so-called "per" salts such as the water-soluble perborates, persulfates, and perchlorates. The catalysts are employed in suitable amounts ranging from 0.1% to about 2.0% based on the weight of the monomeric material to be polymerized.

The next step in the preparation of the products of this invention is one in which the particles of polymeric, aromatic hydrocarbon are halomethylated. This may be done by various chloromethylating and bromomethylating agents (see "Organic Reactions" volume I, chapter 3, page 63 et seq., John Wiley & Sons Inc., N. Y. C., 1942), but the procedure which is by far the most preferred is to treat the particles of polymer with chloromethyl ether and a Friedel-Crafts catalyst. During the step of halomethylating, some cross-linking of the polymer by the halomethylating agent can take place and the amount of such cross-linking appears to be inversely proportional to the amount of cross-linking already present prior to the halomethylating step.

When the polymer being treated is already cross-linked and is completely insoluble, the particles thereof may be immersed in the chloromethyl ether until they swell, after which the Friedel-Crafts condensing agent is added. This soaking and swelling of the particles of polymer facilitates the chloromethylation reaction within the pores of the particles when the Friedel-Crafts catalyst is added.

When the polymer being treated is linear, as in the case of polystyrene per se, or is cross-linked to only a slight extent as, for example, by the use of about 0.1% of a divinyl cross-linker, the treatment with the halomethylating agent, particularly chloromethyl ether, results in cross-linking and insolubilization of the polymer as well as in halomethylation thereof. In such instances methylene bridges link the molecules of polymer together. In the preferred process of simultaneously cross-linking and chloromethylating, the chloromethyl ether and the Friedel-Crafts condensing agent are first mixed and the particles of aromatic hydrocarbon polymer, such as polystyrene, are then added to or treated with this mixture. Linear polymers, such as polystyrene, soften rapidly and dissolve in chloromethyl ether alone; but, when the Friedel-Crafts catalyst is present, the cross-linking and insolubilization of the polymer occurs so rapidly that the polystyrene particles are prevented from dissolving or softening and coalescing. Polystyrene, when treated in this fashion, has all the properties of an insoluble, infusible, cross-linked polymer and, in fact, appears to be more highly cross-linked than a similarly treated polystyrene polymer which had been previously cross-linked with 1% divinyl benzene, but it does not appear to be as highly cross-linked as a chloromethylated copolymer of polystyrene cross-linked with 6% divinyl benzene.

The extent of the halomethylation reaction is conveniently determined by a halogen analysis. It is desirable that as many halomethyl groups as possible be introduced into the insoluble copolymer because the number of such groups determines the number of polar groups that can be introduced into the final product; and the number of such polar groups determines the capacity of the resin to adsorb ions. Although resins containing relatively few polar groups have some capacity for adsorbing or exchanging ions, it is necessary from a practical standpoint to add a large number of such groups in order to produce a resin of sufficiently high capacity to be commercially attractive. The number of such groups should be at least one for every 15 aromatic hydrocarbon nuclei in the polymer. A chloromethylated copolymer of styrene and 1% divinyl benzene having this number of chloromethyl groups would analyze about 2% chlorine. The upper limit of halomethylation is that reached when every available position in the aromatic nuclei is halomethylated. Satisfactory resins of high capacity, however, can be made in which the number of halomethyl groups which are introduced is less than the theoretical maximum. Thus, very valuable resins are copolymers containing one to six halomethyl groups for every four aromatic hydrocarbon nuclei.

The following examples serve to illustrate the preferred method of preparing the products of this invention.

*Example 1*

A. Into a one-liter, three-necked, balloon flask equipped with thermometer, mechanical stirrer, and reflux condenser was poured 400 ml. of water and 34 ml. of a 1.5% aqueous solution of magnesium silicate. Agitation was begun and a solution containing 97.5 g. of styrene, 1 g. of divinyl benzene, and 1.5 g. of ethyl styrene, with 1 g. of benzoyl peroxide dissolved therein, was added to the contents of the flask. The stirred mixture was then heated to 90° C. and held there for one and one-half hours, after which the mixture was heated at refluxing temperature for an additional one and one-half hours. The reaction mixture was then cooled to room temperature and the solid spheroids of the copolymer were separated from the liquid by decantation and filtration, air-dried, and finally oven-dried for two hours at 125° C.

In a similar manner copolymers containing higher amounts of divinyl benzene may be prepared.

B. Fifty grams of the beads of copolymer prepared in part A above were placed in a one-liter, three-necked, balloon flask equipped with thermometer, mechanical stirrer, and reflux condenser. This amount corresponds to 0.5 mole of styrene in the form of a cross-linked copolymer. One hundred grams (1.25 moles) of chloromethyl ether, having the formula $CH_3-O-CH_2Cl$, was added and the mixture was allowed to stand at room temperature for 15 minutes during which time the beads of copolymer swelled. The mixture was then diluted with 115 ml. of petroleum ether (B. P. 30° C.–60° C.) and agitation was begun. The reaction mixture was cooled to 0° C. by means of an ice-salt bath and at this point 30 grams (0.23 mole) of anhydrous, powdered aluminum chloride was added in small portions over a period of one hour, after which the mixture was stirred at 0° C. for two hours. Then 500 ml. of ice water was slowly added in order to decompose the excess of aluminum chloride and chloromethyl ether. The resultant mixture was stirred for 30 minutes and was filtered. The beads were first dried in air, then washed several times with water and finally dried in an oven at 125° C. for two hours.

The beads contained 21.97% chlorine by analysis.

The chloromethylated copolymer may be converted to an ion-exchange resin by the following procedure.

C. In a 500 ml., three-necked, balloon flask, equipped with an agitator, reflux condenser, thermometer, and a gas-inlet tube, were placed 115 ml. of benzene and 50 grams of the chloromethylated beads prepared in part B above. Agitation was begun and the mixture was heated to refluxing temperature and held there for 30 minutes, during which time the beads swelled. The mixture was cooled to 20° C. and was saturated with anhydrous trimethylamine gas. The mixture was then heated to 50°–55° C. and held there for four hours while a steady stream of trimethylamine was passed therethrough. The mixture was then cooled to room temperature and allowed to stand overnight, after which the beads were filtered off, washed twice with benzene, and air-dried. The dried beads, free of benzene, were then mixed with a 10% aqueous solution of sulfuric acid for two hours, after which they were washed thoroughly with water and were finally converted to the form of the quaternary ammonium hydroxide by being stirred with a 15% aqueous solution of sodium hydroxide. The final product was washed with water until the wash-water no longer gave a pink color with phenolphthalein.

The dried beads contained 5.68% nitrogen by analysis, had high capacity for adsorbing anions, and had such physical characteristics suitable for use in commercial water-treating apparatus. The beads were also capable of repeated use in adsorbing ions and being regenerated.

*Example 2*

A. Into a five-liter, three-necked, balloon flask equipped with thermometer, mechanical stirrer, and reflux condenser was poured 1800 ml. of water which contained as dispersing agent 27 g. of a 20% solution of a copolymer of substantially equal parts of styrene and maleic acid dissolved in aqueous ammonia. Agitation was begun and a solution containing 10.8 g. of benzoyl peroxide dissolved in 1080 g. of styrene was added to the contents of the flask. The stirred mixture was then heated to 85° C.–90° C. and held there for four and one-half hours. The reaction mixture was cooled to room temperature by the addition of cold water, and the spheroids of polystyrene were separated from the liquid by decantation and filtration and then allowed to air-dry overnight.

The yield of polystyrene particles was quantitative. At this stage the polystyrene particles were fusible and soluble in all of the polystyrene solvents.

B. Forty-three grams of chloromethyl ether, having the formula $CH_3-O-CH_2Cl$, containing 13.12 g. (0.1 mole) of anhydrous, powdered aluminum chloride dissolved therein was poured into a one-liter, three-necked, balloon flask equipped with a thermometer, mechanical stirrer and reflux condenser. The flask and contents were cooled to 0° C. by means of an ice-salt bath and 100 ml. of petroleum ether (B. P. 30° C.–60° C.) was added. Agitation was begun and 25 g. of polystyrene particles prepared in part A above were added in small portions, over a period of 30 minutes after which the cooling bath was removed. The reaction mixture was stirred for three hours at room temperature. Then the mixture was again cooled to 0° C. by means of an ice-salt bath and 125 ml. of ice-water was slowly added in order to decompose the excess of aluminum chloride and chloromethyl ether. The resultant mixture was stirred for one hour and was filtered. The beads were washed with water for two hours, filtered, and dried in an oven for two hours at 125° C.

At this stage the beads were infusible and insoluble in all of the common solvents for polystyrene. The beads contained 18.16 per cent. chlorine by analysis.

The chloromethylated styrene may be converted to an ion-exchange resin in the following manner.

C. In a one-liter, three-necked, balloon flask, equipped with a mechanical stirrer, reflux condenser, thermometer, and a gas-inlet tube, were placed 250 ml. of toluene and 30 grams of the chloromethylated beads prepared in part B above. This mixture was allowed to stand at room temperature for one hour, during which time the beads swelled. Agitation was begun and the mixture was cooled to 20° C. and saturated with anhydrous trimethylamine gas. The mixture was then allowed to come to room temperature and stirred for four hours. After this time agitation was stopped and the beads were removed by filtration. The toluene-wet beads were stirred for one hour in two 200 ml. portions of methanol in order to remove the last traces of toluene. The beads were removed by filtration, washed with water, and stirred with 500 ml. of 10% hydrochloric acid for two hours. (At this stage analysis of the beads showed that they contained 4.27% N and 10.97% Cl.) The acid-leached beads were washed thoroughly with water and were finally converted to the form of the quaternary ammonium hydroxide by being washed in a column with a 5–10% aqueous solution of sodium hydroxide until a positive chloride ion test could no longer be obtained. The final product was washed with water until the wash-water no longer gave a pink color with phenolphthalein.

*Example 3*

A. Into a one-liter, three-necked, balloon flask equipped with thermometer, mechanical stirrer, and reflux condenser was poured 400 ml. of water and 34 ml. of a 1.5% aqueous solution of magnesium silicate. Agitation was begun and a solution containing 88.77 g. of styrene, 11.23 g. of a commercial solution of divinyl benzene (containing 53.4% divinyl benzene and 46.6% ethylvinyl benzene), with 1 g. of benzoyl peroxide dissolved therein, was added to the contents of the flask. The stirred mixture was then heated to 90° C. and held there for one and one-half hours, after which the mixture was heated at refluxing temperature for an additional one and one-half hours. The reaction mixture was then cooled to room temperature and the solid spheroids of the copolymer were separated from the liquid by decantation and filtration, and dried in an oven for eight hours at 125° C.

B. Eighty grams of the spheroids or beads of copolymer prepared in part A above were placed in a one-liter, three-necked, balloon flask equipped with thermometer, mechanical stirrer, and reflux condenser. The amount corresponds to 0.744 mole of styrene in the form of a crosslinked copolymer. One hundred thirty-seven and one-half grams (1.71 moles) of chloromethyl ether, having the formula $CH_3O-CH_2Cl$, was added and the mixture was allowed to stand at room temperature for one hour during which time the beads of copolymer swelled. The mixture was then diluted with 105.5 g. of an aliphatic hydrocarbon solvent (B. P. 110°–116.67° C.) and agitation was begun. The reaction mixture was held at about 37° C. with cooling while 42 grams (0.316 mole) of anhydrous aluminum chloride was added over a period of one hour, after which the mixture was stirred at 37° C. for eight hours. Then 500 ml. of cold water was slowly added to decompose the excess of aluminum chloride and chloromethyl ether. The resultant mixture was stirred for thirty minutes and filtered. The beads were then washed several times with water and finally dried in an oven at 125° C. for 12 hours.

The beads contained 14.0% chlorine by analysis.

Conversion of this chloromethylated copolymer to an ion-exchange resin may be performed as follows.

C. In a one-liter, three-necked, balloon flask, equipped with an agitator, reflux condenser, thermometer, and a gas-inlet tube, were placed 320 grams of toluene and 91 grams of chloromethylated beads prepared in part B above. Agitation was begun and the mixture was heated to 80° C. for one hour, during which time the chloromethylated beads swelled. The mixture was then cooled to room temperature and 112 g. of trimethylamine gas was slowly added to the flask. During this addition a slight exotherm took place. The mixture was cooled, and a temperature of 35°–40° C. was maintained for five hours. After this time the mixture was cooled to 25° C. and the beads were separated by filtration, washed once with toluene and then steam-distilled in order to remove the last traces of toluene.

The beads were then washed with water and converted to the hydroxide form by being stirred with a 4% solution of sodium hydroxide. The final product was washed with water until the wash-water no longer gave a pink color with phenol-phthalein.

The dried beads contained 4.17% nitrogen by analysis and showed a quaternary capacity of 3.24 meq./g. or 1.29 meq./ml. and a density of 0.40 g./ml.

The foregoing examples illustrate three types of resin that are within the scope of this invention and their conversion to quaternary ammonium ion-exchange materials. In Example 1 there is illustrated a resin that is relatively porous as compared to the other two. This resin is representative of resins made with from 0.5 to 2% divinyl benzene or equivalent amount of other cross-linking aromatic hydrocarbon. Ion-exchange materials made from resins of this type will adsorb all the ions that are adsorbable by corresponding materials made from the denser resins but their capacity per unit of volume is considerably lower than that of a resin made with from 4 to 8% divinyl benzene as illustrated in Example 3. Example 3 is illustrative of a relatively dense resin as may be made with from 4 to 8% of divinyl benzene or equivalent amount of other cross-linking aromatic hydrocarbon. On a weight basis these two resins when converted to ion-exchange materials have capacities of the same order of magnitude but because the Example 3 resin is considerably denser its volume capacity, i. e., its capacity per unit of volume, is considerably higher than that of the Example 1 resin. Therefore, in all instances wherein either resin may be used, the Example 3 resin has the advantage over the Example 1 resin in that smaller equipment may be used to accomplish the same operating capacity. However, because of the highly porous nature of the Example 1 type of resin, the ion-exchange materials made from it will adsorb some complex organic ionic materials that cannot be adsorbed by the denser resins. This is believed to be due to the relative size of the pores in the two resins, the Example 1 resin having pores of sufficient size to permit passage of large ionic substances that cannot readily diffuse into the particles of the Example 3 resin.

This difference may be illustrated by the difference in behavior of the quaternary ammonium exchangers toward the penicillin molecule. One-hundredth normal solutions of pure penicillin G were passed through columns of quaternary ammonium resin in the chloride form prepared in accordance with Examples 1 and 3 respectively. The resins were used in the salt form because of the known instability of penicillin. At the breakthrough point the resin of Example 1 had adsorbed 0.93 milliequivalent of penicillin per milliliter of resin whereas the resin of Example 3 had adsorbed only 0.012 milliequivalent per milliliter. To determine the effect that the presence of other ions may have upon the ability of the Example 1 resin to adsorb penicillin, solutions were tested that contained in addition to the penicillin various salts, such as sodium chloride, sodium sulfate, and monosodium phosphate. It was found that the chloride ion had the least effect upon the adsorption of penicillin. In the recovery of penicillin from its culture media, the resin of Example 3 in the chloride form may be used first, to replace all small ions in the broth with chloride ions whereby the broth is conditioned for penicillin adsorption, and then the resin of Example 1 in the chloride form is used for the recovery of the penicillin. The adsorbed penicillin may be eluted with 5–10% sodium chloride solution or with other salt solution.

The quaternary ammonium exchanger of Example 1 has also shown high capacity for vitamin $B_{12}$ and also for insulin which, however, must be desorbed with dilute acid. In also decolorizes sugar solutions and is particularly efficient in decolorizing cane syrups.

As is disclosed in U. S. application Serial No. 759,309, filed July 5, 1947, primary and secondary amines may be reacted with the halomethylated copolymers to produce anion-exchange resins that are not as strongly basic as the quaternary ammonium exchangers.

I claim:

1. A polymer of an aromatic monovinyl hydrocarbon cross-linked by copolymerization with an aromatic polyvinyl hydrocarbon, the polymer containing as substituents on the aromatic nuclei methylene halide groups of the formula $—CH_2X$ wherein X is a member of the group consisting of chlorine and bromine.

2. A polymer of styrene cross-linked by copolymerization with from 0.1 to 8% divinyl benzene containing methylene chloride groups as substituents on the aromatic nuclei.

3. A copolymer of an aromatic monovinyl hydrocarbon and from 0.1 to 8% of an aromatic divinyl hydrocarbon, the copolymer containing methylene chloride groups as substituents on the aromatic nuclei.

4. The process of preparing an insoluble resinous product containing reactive halogen atoms and capable of being converted to an insoluble ion-exchange resin which comprises subjecting a polymer of an aromatic monovinyl hydrocarbon cross-linked by copolymerization with an aromatic polyvinyl hydrocarbon in the form of particles of a size of from 5 to 325 mesh to the action of a Friedel-Crafts catalyst and a halomethylating agent in which the halogen is selected from the group consisting of chlorine and bromine.

5. The process of preparing an insoluble resinous product containing reactive halogen atoms and capable of being converted to an insoluble ion-exchange resin which comprises soaking particles of a copolymer of styrene and from 0.5 to 8% divinyl benzene having a particle size of from 5 to 325 mesh in chloromethyl ether and after the particles swell adding to the mixture a Friedel-Crafts catalyst.

6. An insoluble resinous composition containing replaceable chlorine comprising the reaction product of chloromethyl ether and a copolymer of a major portion of a monovinyl aromatic hydrocarbon with from 0.5 to 20.0% of a divinyl aromatic hydrocarbon, said reaction product containing an average of from 0.2 to 1.2 halomethyl groups per aromatic nucleus.

7. A polymer of an aromatic monovinyl hydrocarbon cross-linked by copolymerization with divinylbenzene, the polymer containing as substituents on the aromatic nuclei methylene halide groups of the formula —$CH_2X$, wherein X is a member of the group consisting of chlorine and bromine.

CHARLES H. McBURNEY.

REFERENCES CITED

The following references are of record in the file of this patent:

UNITED STATES PATENTS

| Number | Name | Date |
| --- | --- | --- |
| 2,469,845 | Renoll | May 10, 1949 |
| 2,591,574 | McBurney | Apr. 1, 1952 |
| 2,597,439 | Bodamer | May 20, 1952 |
| 2,597,440 | Bodamer | May 20, 1952 |